(12) United States Patent
Roth et al.

(10) Patent No.: US 9,805,190 B1
(45) Date of Patent: Oct. 31, 2017

(54) MONITORING EXECUTION ENVIRONMENTS FOR APPROVED CONFIGURATIONS

(71) Applicant: Amazon Technologies, Inc., Seattle, WA (US)

(72) Inventors: Gregory Branchek Roth, Seattle, WA (US); Peter Zachary Bowen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/461,136

(22) Filed: Mar. 16, 2017

Related U.S. Application Data

(62) Division of application No. 14/475,940, filed on Sep. 3, 2014, now Pat. No. 9,600,664.

(51) Int. Cl.
  *G06F 21/00* (2013.01)
  *G06F 21/53* (2013.01)
  *G06F 21/60* (2013.01)

(52) U.S. Cl.
  CPC ............ *G06F 21/53* (2013.01); *G06F 21/604* (2013.01); *G06F 2221/034* (2013.01)

(58) Field of Classification Search
  CPC ............................... G06F 21/53; G06F 21/604
  See application file for complete search history.

(56) References Cited

U.S. PATENT DOCUMENTS

| 8,332,594 | B2 * | 12/2012 | Borntraeger | G06F 12/109 711/147 |
| 2005/0039180 | A1 * | 2/2005 | Fultheim | G06F 9/45533 718/1 |
| 2005/0071668 | A1 * | 3/2005 | Yoon | G06F 11/28 726/22 |
| 2005/0193103 | A1 | 9/2005 | Drabik | |
| 2008/0178290 | A1 * | 7/2008 | Besch | G06F 21/53 726/22 |
| 2009/0172666 | A1 * | 7/2009 | Yahalom | G06F 3/0605 718/1 |
| 2010/0131755 | A1 * | 5/2010 | Zhu | H04L 63/0815 713/155 |
| 2011/0125894 | A1 * | 5/2011 | Anderson | H04L 9/3213 709/224 |

(Continued)

OTHER PUBLICATIONS

Office action for U.S. Appl. No. 14/475,940, dated Jun. 3, 2016, Roth et al., "Managing Execution Environments for Approved Configurations", 19 pages.

*Primary Examiner* — Ali Shayanfar
(74) *Attorney, Agent, or Firm* — Lee & Hayes, PLLC

(57) ABSTRACT

Functionality is disclosed herein for monitoring an execution environment to determine if the execution environment is in an approved configuration. Memory used by the execution environment may be scanned from outside of the execution environment to determine whether the execution environment is in an unapproved configuration. The scanning may include examining the memory for abnormalities or other irregular or unapproved data. When the execution environment is in the unapproved configuration, actions may be performed that change how the execution environment accesses resources or performing other types of functionality.

20 Claims, 9 Drawing Sheets

(56) References Cited

U.S. PATENT DOCUMENTS

| | | | |
|---|---|---|---|
| 2011/0296430 A1* | 12/2011 | Jandhyala | G06F 21/6218 718/108 |
| 2012/0054744 A1* | 3/2012 | Singh | G06F 21/53 718/1 |
| 2012/0066681 A1* | 3/2012 | Levy | G06F 9/5027 718/1 |
| 2012/0255012 A1 | 10/2012 | Sallam | |
| 2013/0019306 A1 | 1/2013 | Lagar-Cavilla et al. | |
| 2013/0091355 A1 | 4/2013 | Lear et al. | |
| 2013/0125117 A1* | 5/2013 | Niesser | G06F 9/45533 718/1 |
| 2013/0160099 A1 | 6/2013 | Fitzpatrick, III | |
| 2013/0246685 A1* | 9/2013 | Bhargava | G06F 21/00 711/6 |
| 2013/0347131 A1* | 12/2013 | Mooring | G06F 9/45558 726/29 |
| 2014/0245444 A1 | 8/2014 | Lutas et al. | |
| 2014/0298413 A1 | 10/2014 | Anderson et al. | |
| 2015/0113526 A1 | 4/2015 | Baboval | |

\* cited by examiner

MONITORING EXECUTION ENVIRONMENTS FOR APPROVED CONFIGURATIONS

CROSS-REFERENCE TO RELATED APPLICATIONS

This patent application is a divisional application of, and claims priority to, co-pending, commonly-owned U.S. patent application Ser. No. 14/475,940, entitled "MANAGING EXECUTION ENVIRONMENTS FOR APPROVED CONFIGURATIONS", filed on Sep. 3, 2014, which is incorporated herein by reference in its entirety.

BACKGROUND

In some cases, a software application may become infected with a virus or some other type of malicious software (e.g., malware). In other cases, a software application might not be properly configured or might have some other problem that prevents the application from executing properly. In these cases, executing the infected software application may pose a security risk, or some other type of risk (e.g., a health risk) to a computing device, and possibly other computing devices.

There are many forms of defense mechanisms that might be used to assist in detecting when a software application is a risk to one or more computing devices. For example, anti-virus software, anti-malware software, firewalls, or some other mechanism might be used to prevent a software application from executing. In some cases, however, it may be challenging to detect and prevent software applications that pose a risk to one or more computing devices from executing in a computing environment. The challenge might even be greater in a distributed computing environment that executes virtual machine instances (which may be referred to herein as "VMs" or "instances").

It is with respect to these and other considerations that the disclosure made herein is presented.

DETAILED DESCRIPTION

Figure 1:
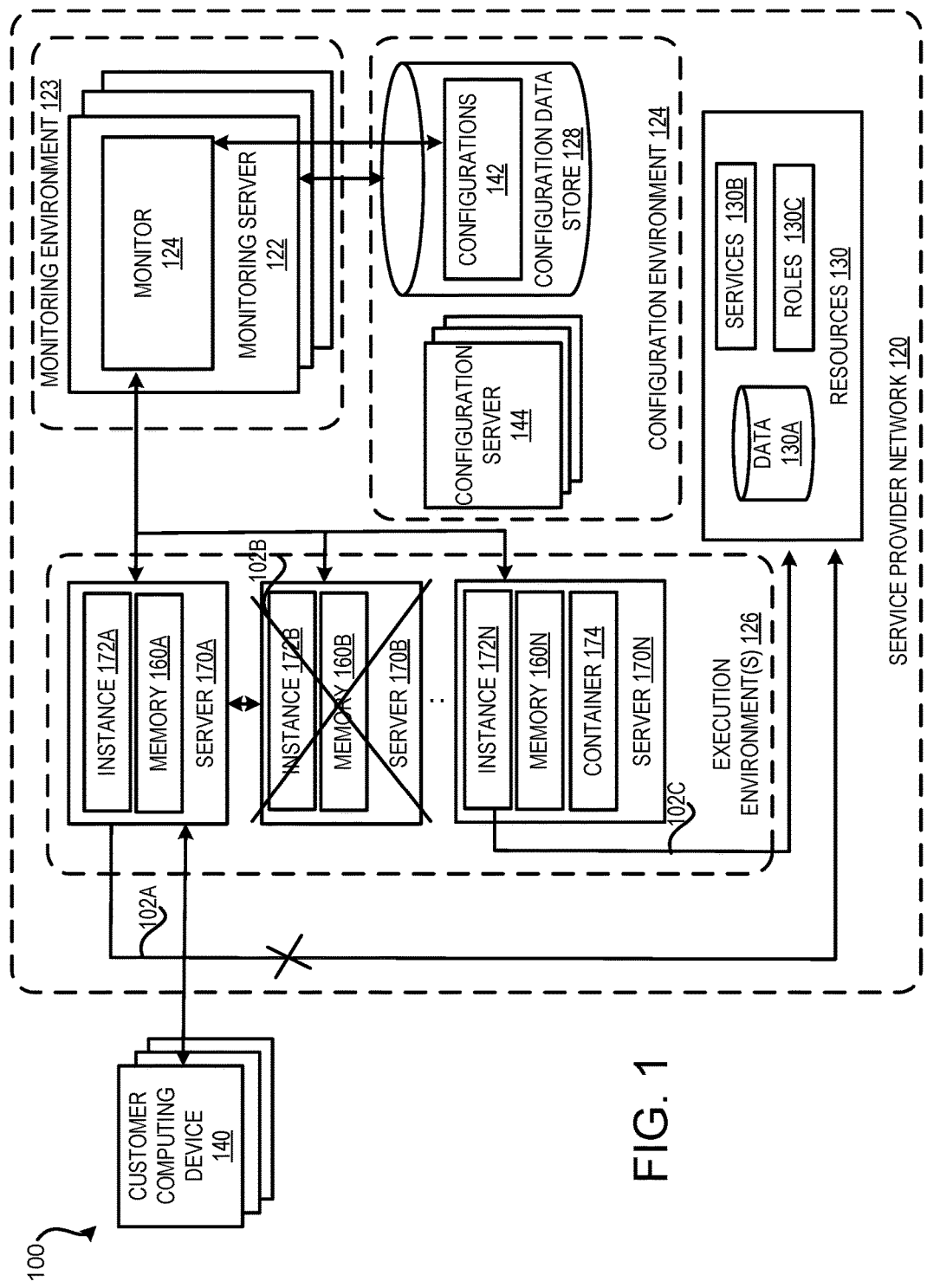
FIG. 1 is a block diagram depicting an illustrative operating environment in which execution environments are monitored for approved configurations.

The following detailed description is directed to technologies for monitoring the configurations of execution environments, such as virtual machine instances or containers. Through an implementation of the technologies disclosed herein, virtual machine instances, which may be referred to as "instances" or "VMs", and/or other execution environments, such as containers, may be monitored to determine whether the execution environments are in an approved configuration or are in an unapproved configuration. The monitoring of an execution environment may include examining memory that is associated with the execution environment as well as examining other resources that might be utilized by the execution environment. These resources might include attached hardware, virtual networks, other software, and the like.

The monitoring of the execution environment for an approved configuration might also include scanning memory used by the execution environment, examining a processor configuration used by the execution environment, examining disk usage of the execution environment, and the like. Execution traces, central processing unit ("CPU") history, or other types of abnormality detection might also be used to detect whether an execution environment is in an approved configuration. Other types of mechanisms might also be used to detect whether the execution environment is in an approved configuration. For example, anti-virus and malware detection mechanisms might be used to determine if the execution environment is infected with a virus or malware.

The scanning of the memory might include examining the memory for data (e.g., executable code or data) that is expected to be within the memory. The memory might also be examined to detect whether the memory contains abnormalities (e.g., unexpected items). The unexpected items might be unauthorized code (e.g., a virus, malware, or some other unexpected code or data) that is included in the memory. Executable code in the memory as well as non-executable code in the memory may be scanned and examined.

A whitelist and/or a blacklist might be used to determine what data is allowed in the memory (e.g., approved data specified by the whitelist) and what data is not allowed in the memory (e.g., unapproved data specified by the blacklist). In some examples, all or a portion of the memory is examined periodically as the execution environment executes. In other examples, a page of memory might be examined before the memory page is approved for loading.

As briefly discussed above, different detection mechanisms might be used to determine whether an execution environment is in an approved configuration. For example, the detection mechanisms might include signature-based detection mechanisms as well as anomaly-based detection mechanisms. For example, a signature-based detection mechanism might be used to examine the memory to determine if an unexpected bit pattern is encountered in the memory. In an anomaly-based detection, the memory may be examined to determine that the memory is in an expected state (e.g., the memory does not contain inconsistencies or other irregularities). The expected state of the memory might be determined from other executing execution environments, such as other instances, of the same type, as well as from previous instances that have executed. When the memory is inconsistent as compared to the other memories, the execution environment may be determined to be in an unapproved configuration. The detection mechanisms might also examine the resources requested by the execution environment. For example, the detection mechanisms might examine a processor configuration requested by an instance, the disk usage of the instance, and the like.

When an execution environment is determined to be in an unapproved configuration, different actions may be taken to restrict the operation of the execution environment. For example, and without limitation, the execution environment might be terminated, isolated or placed into a forensics mode for further examination. In cases where the execution environment is not terminated, the execution environment might be prevented from accessing certain resources until the problem is addressed. For example, the execution environment might be placed into a sandbox for execution. Generally, a sandbox is a security mechanism that restricts the execution environment from accessing one or more resources. The sandbox might allow access by the execution environment to a configuration server but disallow other types of network accesses. For example, access to a virtual network might not be allowed until the execution environment is in an approved configuration. Similarly, an execution environment might not be permitted to access a disk, a database or some other resource until the execution environment is determined to be in an approved configuration.

In some cases, execution of an instance, or some other type of execution environment, might be started in a sandbox and, later, the instance might be permitted to execute outside the sandbox in response to a determination that the instance is in an approved configuration. In other examples, the instance might be placed into the sandbox for execution after the instance is determined to be in an unapproved configuration.

An execution environment might be examined at different times to determine whether the execution environment is in an approved configuration. For example, an instance might be examined as the instance is loading or while the instance is executing in a virtualized environment. In some configurations, the execution environment is examined from outside of the execution environment that is executing. For example, another instance might be configured to examine an execution environment, a hypervisor might examine the execution environment, a monitoring server might examine the execution environment, another processor might examine the execution environment, or some other type computing resource (e.g., a dongle, a network card) might examine the execution environment.

In some examples, an execution environment might be prevented from accessing a resource until the execution environment is in an approved configuration to access the resource. The approved configuration that is required to access the resource might be determined from an access policy. For instance, an access policy that is associated with the resource might specify an approved configuration for the execution environment before the execution environment is allowed to access the resource. For example, an access policy for a database resource might specify that any execution environment that stores data in the database is to include code that anonymizes data such that the data when inserted into the database does not include personally identifiable information. The approved configuration might be stored in an access policy that is associated with the execution environment. In other examples, the approved configuration might be determined using data obtained from other similar execution environments (e.g., instances) that are currently executing or have executed.

Different type of actions may be taken when an execution environment is determined to be in an unapproved configuration. For example, the actions might include, but are not limited to, preventing an execution environment from accessing one or more resources, preventing the execution environment from accessing a Virtual Private Network ("VPN") or some other network, terminating a VPN, enabling enhanced monitoring of the execution environment, retaining past network traffic in a buffer that has been routed to the execution environment (e.g., capture data to retroactively look at the network traffic), and the like.

The monitoring of an execution environment might be performed within and/or provided by a service provider network. The monitoring might be a paid-for service and/or included with the use of one or more resources provided by the service provider network. For example, a customer of the service provider network might be charged for monitoring of execution environment operated by the customer. In other examples, the monitoring might be performed as part of the normal execution of the execution environment and paid for by the customer in a charge for executing the execution environment. An authorized user might also be allowed to turn on and turn off the monitoring. Additional details regarding the various components and processes described above for providing access to a resource will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which instances are monitored for approved configurations. As illustrated, the operating environment 100 includes one or more computing devices, such as servers 170A-170N in communication with one or more monitoring servers 122. In some examples, the computing devices are configured to operate in a service provider network 120.

As described in more detail below, the service provider network 120 may include a collection of rapidly provisioned and, potentially, released computing resources hosted in a distributed computing environment. The computing resources may include a number of computing, networking and storage devices in communication with one another. In some embodiments, the computing resources may correspond to physical computing devices, such as the servers 170A-170N. In other embodiments, the computing resources may correspond to virtual machine instances, such as the virtual machine instances 172A-172N, implemented by one or more physical computing devices, such as the servers 170A-170N. In other embodiments, the computing resources may correspond to containers, such as the container 174. A container, such as the container 174, may be an operating system-level virtualization mechanism that may allow running multiple isolated containers (e.g., LinuX containers) on a computing device, such as the server 170N. In still other embodiments, computing resources may correspond to virtual machine instances, containers, and physical computing devices. While the examples of execution environments presented herein refer primarily to virtual machine instances, other types of execution environments (e.g., containers) may be monitored to determine whether the execution environment is in an approved configuration.

In some examples, a customer, using a customer computing device 140, may configure an instance, such as the instance 172A, and launch the instance 172A for execution in an execution environment 126 that is associated with the service provider network 120. As used herein, the terms "customer" and "customers" refer to existing customers of the service provider network 120 as well as visitors (i.e. potential customers) to service provider network 120 that are authorized to execute a virtual machine instance (e.g., the instances 172A-172N) in the service provider network 120.

After a customer, or some other process or user, initiates execution of an execution environment, such as the instance 172A or the container 174, the instance 172A or the container 174 may be monitored from outside of the instance 172A or the container 174. In other words, in some configurations, the instance 172A or the container 174 does not perform its own monitoring. For example, the instance 172A may be monitored by a monitoring environment 123 that includes the monitor 124 illustrated as executing on the monitoring server 122 in FIG. 1. In other configurations, the instance 172A might be monitored using some other mechanism. For example, another instance might be configured to monitor the instance (See, e.g., the monitor VM 210 illustrated in FIG. 2), a hypervisor might monitor the instance 172A, another processor on the same server 170A, a different server might monitor the instance 172A, or some other computing resource might monitor operation of the instance 172A.

The monitoring environment 123 (e.g., the monitor 124) is configured to monitor the execution environment 126, such as the instance 172A, and determine whether the instance 172A is in an approved configuration. As discussed above, an approved configuration might be a configuration in which the instance 172A is executing as intended (e.g., no virus, malware, or no other abnormality) and/or is configured in a manner as required by one or more of the resources 130.

An approved configuration might be determined programmatically or manually. For example, an authorized user associated with the service provider network 120 might specify an approved configuration for an execution environment (e.g., the instance 172A or the container 174). In other embodiments, the approved configuration might be determined using information obtained from similar instances 172 (e.g., the same machine image) that are executing in the service provider network 120 or have executed in the service provider network 120. In some configurations, the configurations 142 that specify the approved configurations for execution environment 126, such as the instances 172 or the container 174, are stored in the configuration data store 128.

The instance 172A might be examined at different times to determine whether the instance 172A is in the approved configuration. For example, the instance 172 might be monitored as the instance 172A is loading or while the instance 172A is executing.

In some examples, the monitoring of the instance 172A may include examining the physical memory 160A that is associated with the instance 172A and/or examining the state of other resources 130 that might be utilized by the instance 172A. The resources 130 might include a variety of different resources, such as, but not limited to attached hardware, virtual networks, other software, and the like.

As briefly discussed above, memory 160A that is used by the instance 172A may be examined. For example, the memory 160A may be examined to determine whether the memory 160A contains expected data (e.g., executable code or data) within the memory. The memory 160A might also be examined to detect whether the memory 160A contains abnormalities (e.g., unexpected items) or other types of irregularities. The unexpected items might be unauthorized code (e.g., a virus, malware, or some other unexpected code or data) that is included in the memory.

Different detection mechanisms might be used by the monitor 124, or some other monitoring mechanism associated with the monitoring environment 123, to determine whether the instance 172A is in an approved configuration. For example, as discussed above, the detection mechanisms might include signature-based detection mechanisms and/or anomaly-based detection mechanisms. In some examples, a signature-based detection mechanism may be used to examine the memory 160A to determine if an unexpected bit pattern is encountered in the memory 160A. In an anomaly-based detection, the memory 160A may be examined to determine whether the memory 160A is in an expected state (e.g., the memory does not contain inconsistencies).

As briefly discussed above, one or more actions may be taken when the instance 172A is determined to be in an unapproved configuration. For example, the instance 172A might be terminated as indicated by the "x" 102B, isolated or placed into a forensics mode of operation for further examination. In some configurations, when the instance 172A is placed into a forensics mode, one or more operations may be performed to determine execution information about the instance 172A. For example, an execution trace might be performed, CPU history might be examined, previous network traffic associated with the instance 172A might be examined, and the like. Restricting the instance 172A might include preventing the instance 172A from accessing certain resources 130 (as indicated by line 102A) until the configuration for the instance 172A is determined to be an approved configuration. For example, the instance 172A might be placed into a sandbox for execution (see FIG. 2). Restricting the instance 172A might also include changing what resources may be accessed the instance 172A. For example, the As described in greater detail below, a sandbox might allow access to a configuration server and disallow other network access to the instance 172A. For example, access to a virtual network might not be allowed until an execution environment is in an approved configuration. Similarly, an execution environment might not be able to access a disk, a database or some other type of computing resource until the instance is determined to be in an approved configuration. In other examples, the execution environment may be able to access a subset of the resources, or different resources when the execution environment is in an unapproved configuration. For instance, the execution environment might be able to access a particular network or data source used to change a configuration of the execution environment 126. The change in how the execution environment accesses to the resources 130 might be enforced by the configuration environment 124.

In some examples, the configuration environment 124, using the configuration server 144 might provide access to metadata that is used by the execution environment when requesting access to the resources 130. For example, the metadata might indicate whether the instance 172A is in an unapproved configuration or an approved configuration. More details on the configuration server 144 are provided below with reference to FIG. 2.

When an instance, such as the instance 172N, is determined to be in an approved configuration, the instance 172N is allowed to access the resources 130 as indicated by line 102C. In some examples, instances 172 might be prevented or restricted from accessing a resource 130 until the instances 172 are in an approved configuration to access the resource 130. For instance, a resource 130 might specify an approved configuration of instances 172 before an instance is allowed to access the resource. For example, a database resource 130 (e.g., access to data 130A) might specify that any instance 172 that accesses the data 130A is to include functionality for anonymizing data such that the data when inserted into the database does not include personally identifiable information for a customer or other user. The approved configuration might be stored in an access policy (e.g., the access policy 216 illustrated in FIG. 2) that is associated with the resource.

Different type of actions might also be taken when the instance 172A is determined to be in an unapproved configuration. For example, the actions might include, but are not limited to preventing access to one or more resources, preventing access to a VPN terminating a VPN, enabling enhanced monitoring of the instance 172A, retaining past network traffic that has been received by the instance 172A (e.g., capturing data to retroactively examine network traffic received at the instance). The actions might also include allowing, limiting or disallowing the execution environment access to a particular virtualized network, certain virtual private clouds, or other type of networks. In some configurations, the execution environment might be placed into a different network that is provided access to resources (e.g., a patch server) to change the configuration of the execution environment to an approved configuration. In some examples, the monitoring environment, such as the monitoring server 122, or some other computing device, may temporarily store network traffic that is provided to the instance 172A. The network traffic might be stored in the memory 160A or some other location.

In some configurations, the monitoring of the execution environment (e.g., the instances 172A-172N and the container 174) is provided by a service provider network 120. For example, the monitoring might be a paid-for service and/or included with the use of one or more resources provided by the service provider network 120. In some configurations, an authorized user may be allowed to turn on and turn off the monitoring of one or more the instances 172. In some cases, a machine image utilized to instantiate an instance 172 specifies rules that are used to determine whether the instance is in an approved configuration.

In some examples, the resources 130 accessed by the execution environment 126 are provided by the service provider network 120. The resources 130 might be network services 130B provided by the service provider network 120, roles 130C that may be used to perform various operations and/or data 130A that might be stored by the service provider network or some other network. For example, the services 130B might be a database service, a storage service, a network service, or other types of services. In some examples, the resources 130 may include other software products and/or other computing resources that are available from the service provider network.

In some examples, the monitor 124, or some other mechanism, may be operative to perform execution traces, examine CPU history, and/or perform abnormality detection to detect whether an instance 172A is in an approved configuration. The monitor 124 might also be configured to employ anti-virus and malware detection mechanisms to determine if the execution environment is infected with a virus or malware. Other technologies might also be utilized to determine if an instance is in an approved configuration.

As illustrated in FIG. 1, in some configurations, the monitoring server 122 accesses a configuration data store 128 that may store one or more configurations 142. The configuration data store 128 may store specifications and other information that might be used to determine whether an execution environment, such as the instance 172A, is in an approved configuration. For example, the monitor 124 might access one of the configurations 142 from the configuration data store 128 before beginning to monitor the instance 172A. The configurations 142 might be obtained from a customer of the service provider network, a software provider that provides software to the service provider network 120, or some other authorized user. In some cases, a charge might be incurred by a customer, or some other user, for monitoring the instance 172A. More details on monitors 172 for approved configurations are provided below. The configuration data store 128 might be external from the monitoring server 122 and/or included within the monitoring server 122.

Figure 2:
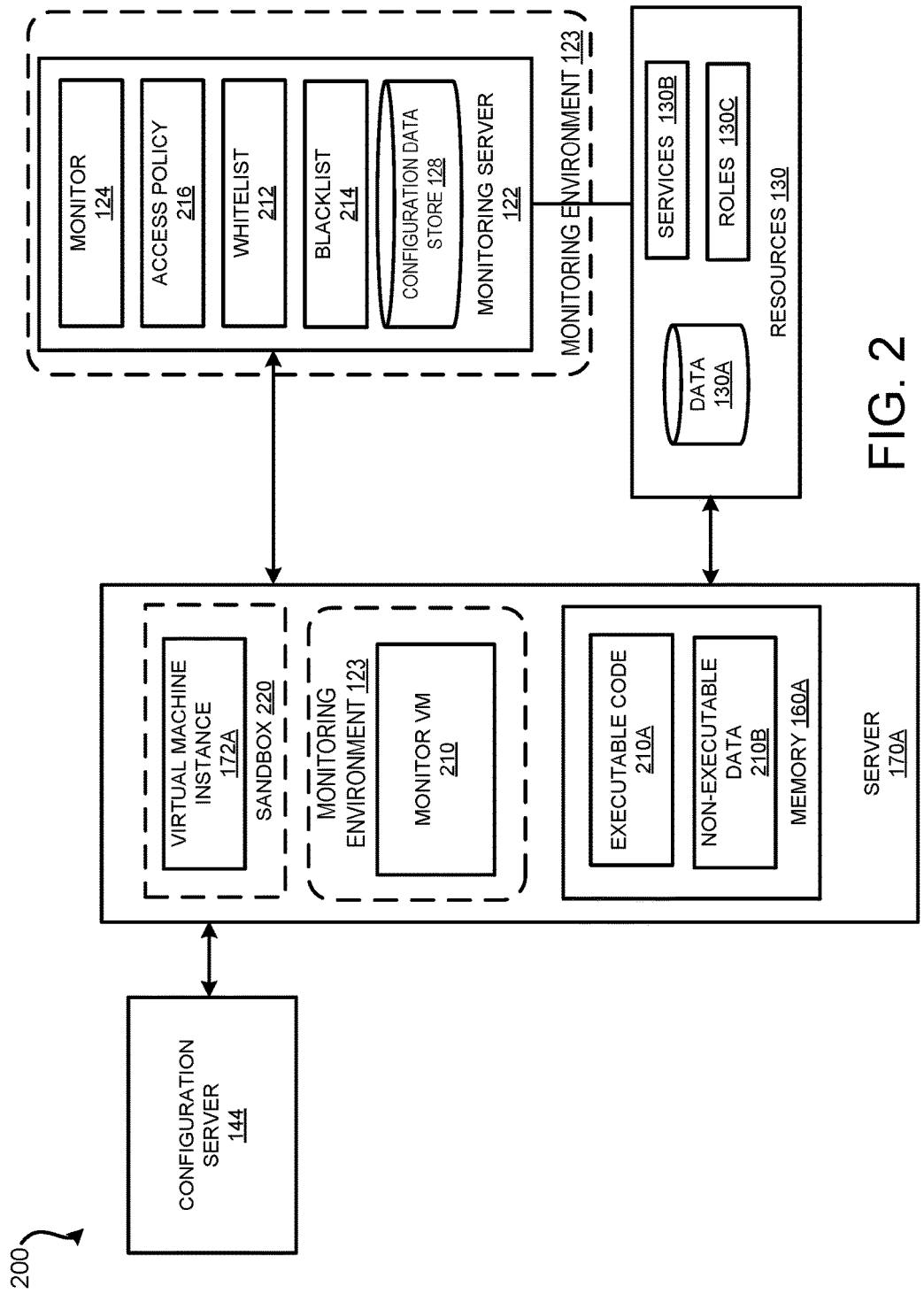
FIG. 2 is a block diagram depicting an illustrative operating environment in which a sandboxed instance is provided access to a configuration server.

FIG. 2 is a block diagram depicting an illustrative operating environment 200 in which a sandboxed instance 172A is provided access to a configuration server 144. The operating environment 200 is similar to the operating environment 100. As illustrated, the environment 200 shows the monitoring server 122, the resources 130, the server 170A and the configuration server 144.

As discussed above, different mechanisms may be used to monitor and determine whether an execution environment, such as the instance 172A, is in an approved configuration. In some examples, execution of the instance 172A might be started in a sandbox 220 and allowed to exit the sandbox 220 in response to a determination that the instance 172A is in an approved configuration. In other examples, execution of the instance 172A might be started outside of the sandbox 220 and moved into the sandbox after the instance 172A is determined to be in an unapproved configuration.

As discussed above, the sandbox 220 is a security mechanism that restricts or changes the instance 172A from accessing one or more resources 130. For example, the sandbox 220 may restrict the instance 172A from accessing a network, accessing other devices (e.g., read or write), and the like. In some examples, the sandbox 220 allows the instance 172A to access the configuration server 144 (as discussed in more detail below) but does not allow the instance 172A to access other resources 130. An access policy 216 might be used to specify the approved configuration for an instance 172 and/or for accessing a resource 130. For example, before an instance 172 is allowed to access the data 130A resource, an access policy 216 might be checked by the monitoring server 122 and used in determining whether the instance 172 is in an approved configuration.

As discussed above, the instance 172A may be examined from outside of the instance 172A that is executing. In the illustration shown in FIG. 2, all or a portion of the functionality of the monitor 124 might be provided as a virtual machine instance, such as the monitor VM 210 that is used to monitor the instance 172A. The monitor VM 210 included in the monitoring environment 123 might be used in place of, or in addition to, the monitor 124. In other examples, a hypervisor might monitor the instance 172A, another processor might monitor the instance 172A, or some other computing resource might monitor the instance 172A.

Executable code 210A as well as non-executable data 210B in the memory 160A may be scanned by the monitor 124 or the monitor VM 210 to determine whether the instance 172A is in an approved configuration. In some example, the monitoring environment 123 identifies a subset of the memory 160A for scanning. For example, the subset of the memory 160A that is identified might include the portion of the memory that contains the executable code 210A that is associated with the kernel or operating system. The monitoring environment 123 may examine the memory 160A for abnormalities. The monitoring might include the use of a whitelist 212 and/or a blacklist 214. The whitelist 212 may specify data that is approved to be in the memory 160A. The whitelist 212 might also specify data that is required to be in the memory 160A. For example, the whitelist 212 may specify data that is to be stored in the memory 106A at specific times when the instance 172A is executing.

In some examples, the data that the whitelist 212 specifies may be dynamically determined. For example, the data specified by the whitelist 212 might be based on the data of the memory that is associated with other similar execution environments (e.g., the same machine image). In other cases, the data specified by the whitelist 212 might be specified by some other user or mechanism. The blacklist 214 may be used to specify what data should not be included in the memory 160. Generally, the blacklist 214 specifies specific data that is not allowed to be included in the memory. The blacklist 214 may be used with or without the whitelist 212.

In some examples, all or a portion of the memory 160A is examined and scanned periodically by the monitor 210 and/or the monitor 124 as the instance 172A executes. In other examples, one or more pages of memory might be examined before the memory page is approved for loading. For example, each memory page might be examined for abnormalities by a hypervisor before the page is allowed to be loaded.

In some examples, an expected state of the memory 160A (e.g., the normal state) might be determined from other instances 172 of the same type executing as well as from previous instances 172 that have executed. When the memory 160A is determined by the monitor 210 to be inconsistent as compared to the other memories utilized by similar instances, the instance may be determined to be in an unapproved configuration.

The configuration server 144 might also be utilized in some configurations in an attempt to place the instance 172A into an approved configuration. For example, the configuration server 144 might be used to remove a virus or malware from the instance 172A. In other cases, a user might utilize the configuration server 144 to address a configuration problem with the instance 172A. Generally, the configuration server 144 may be configured to provide various types of functionality that might be used to place an instance, such as the instance 172A, into an approved configuration.

Figure 3:
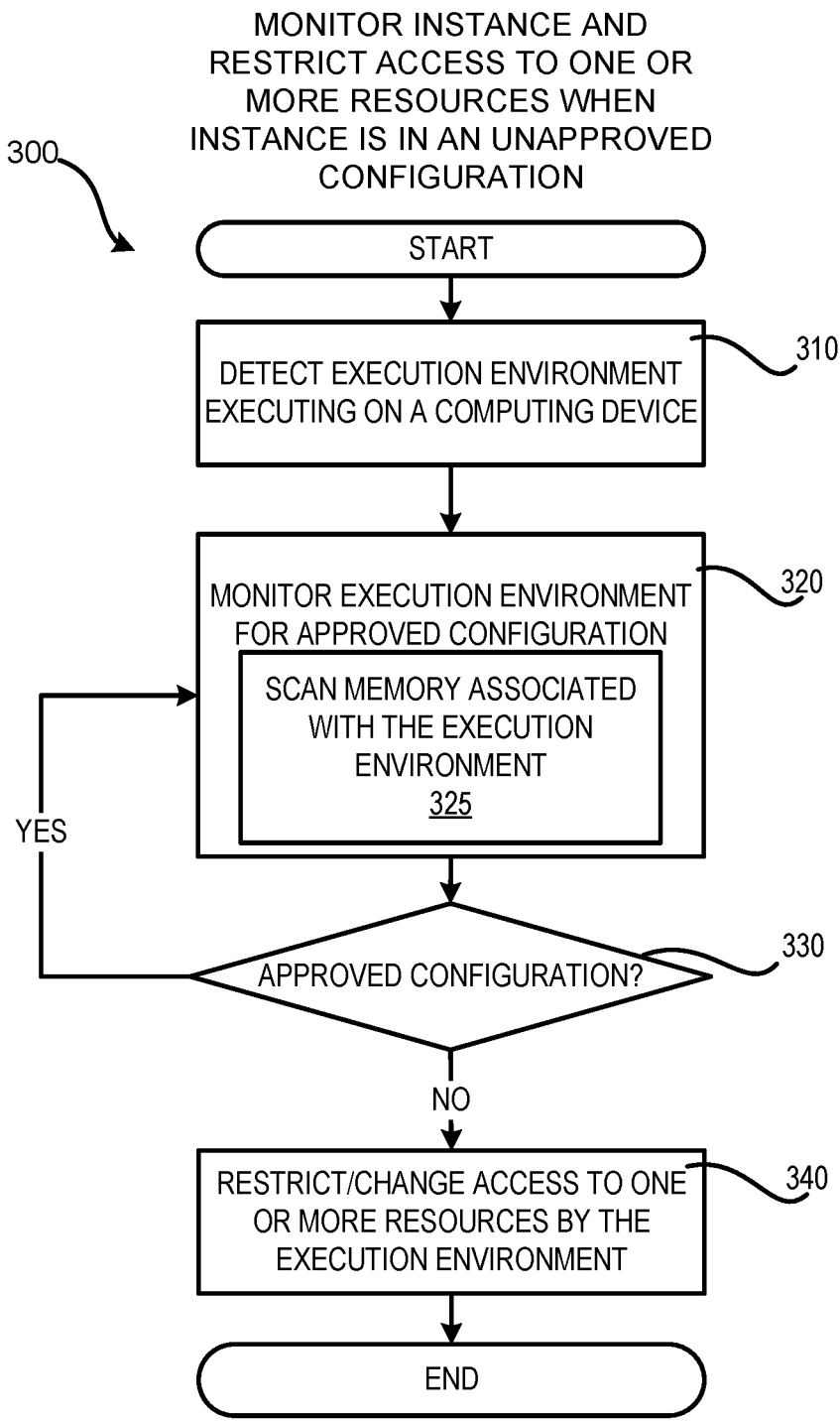
FIG. 3 is a flow diagram showing a routine illustrating aspects of a mechanism disclosed herein for monitoring an execution environment for an approved configuration.
Figure 4:
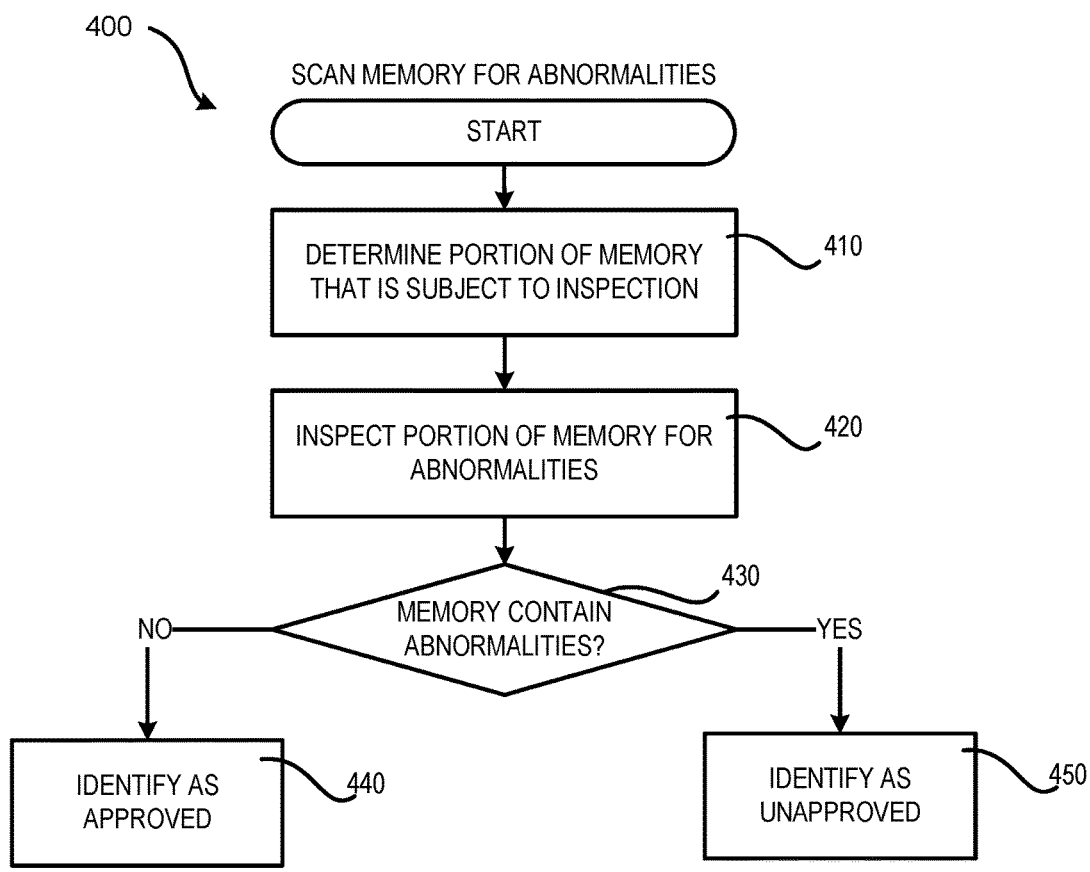
FIG. 4 is a flow diagram showing a routine illustrating aspects of a mechanism disclosed herein for scanning a memory associated with an execution environment.
Figure 5:
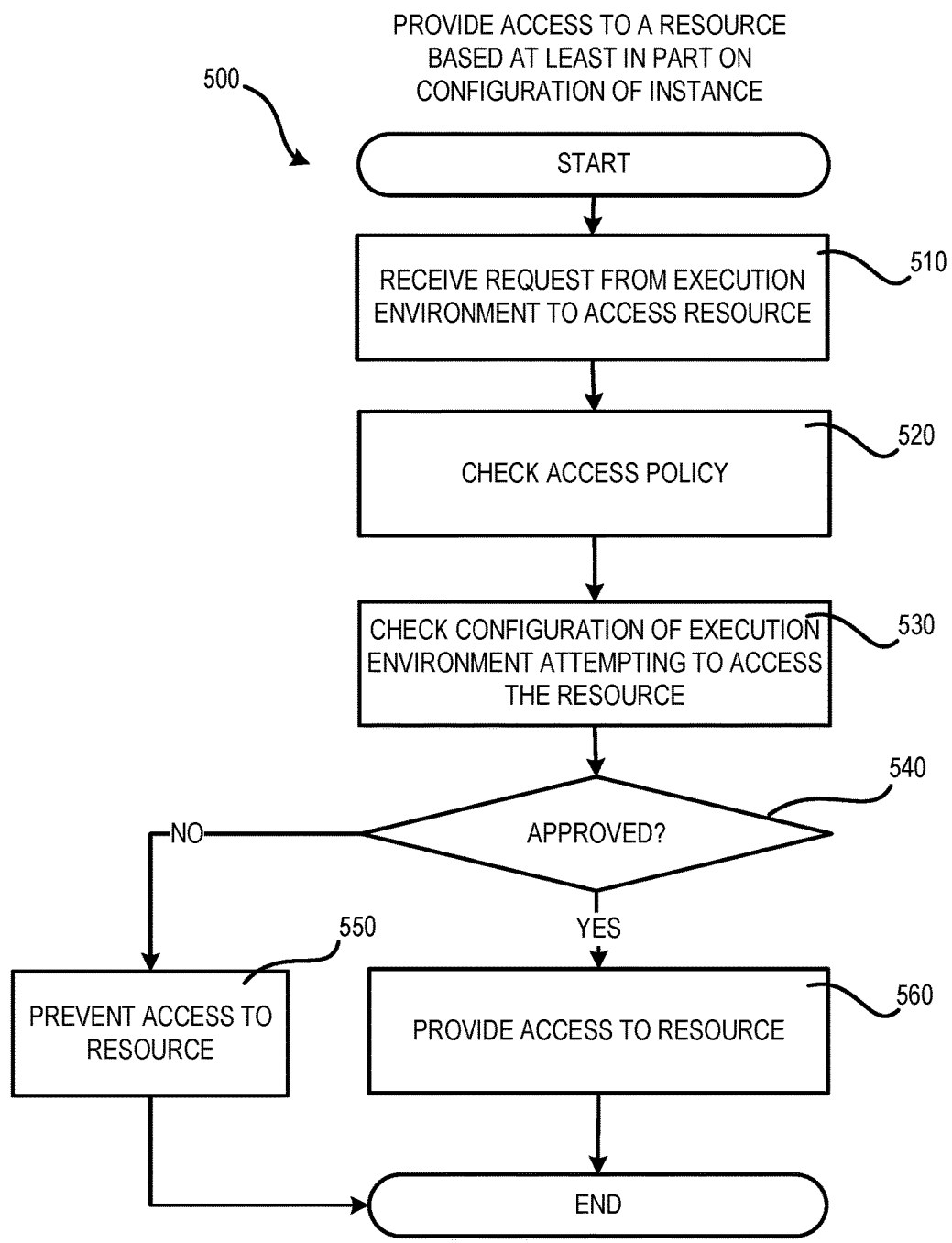
FIG. 5 is a flow diagram showing a routine illustrating aspects of a mechanism disclosed herein for determining whether to allow access to a resource based at least in part on an approved configuration of an execution environment.

FIGS. 3-5 are flow diagrams showing routines that illustrate aspects of monitors for approved configurations, according to an embodiment disclosed herein. It should be appreciated that the logical operations described herein with respect to FIGS. 3-5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 is a flow diagram showing a routine 300 illustrating aspects of a mechanism disclosed herein for monitoring an execution environment for an approved configuration. The routine 300 may begin at operation 310, where an execution environment is detected as executing or loading on a computing device. As discussed above, the instances 172, and other execution environments, are executed in a service provider network 120. In other examples, the instances 172 may be executed using one or more computing devices that are not part of the service provider network 120. For example, the instances 172, or other execution environments, might be executed in a distributed computing environment.

From operation 310, the routine 300 may proceed to operation 320, where the execution environment 126 is monitored to detect whether the execution environment 126 is in an approved configuration or in an unapproved configuration. As discussed above, different mechanisms might be used for monitoring the execution environment 126. In some examples, the memory 160 that is associated with the execution of the execution environment 126 is scanned by the monitor 124 as illustrated by operation 325. The memory 160 may be scanned for data that should be included in the memory as well as for abnormalities in the content of the memory.

From operation 320, the routine 300 may proceed to decision operation 330, where a determination is made as to whether the execution environment 126 is in an approved configuration. In response to determining that the execution environment 126 is in an approved configuration, the routine 300 may return to operation 320. In response to determining that the execution environment 126 is in an unapproved configuration, the routine 300 may proceed to operation 340.

At operation 340, access to the one or more resources 130 the execution environment 126 may be restricted or changed. As discussed above, an instance 172, or other execution environment, that is in an unapproved configuration might be terminated, isolated or placed into a forensics mode of operation. For example, the instance 172A might be placed into a sandbox 220 for execution that restricts the instance 172A from accessing specified resources in the service provider network 120. In some examples, the instance 172 may access a configuration server 144, and possibly other resources 130, that might be used to place the instance 172 into an approved configuration. As discussed above, when the instance 172 is placed into a forensics mode, one or more operations may be performed regarding the instance 172. The routine 300 then proceeds to an end operation. Alternately, the routine 300 might proceed back to repeat some or all of the processing operations described above. For example, from operation 340, the routine 300 may proceed back to operation 320.

FIG. 4 is a flow diagram showing a routine 400 illustrating aspects of a mechanism disclosed herein for scanning a memory 160 associated with an execution environment 126. The routine 400 may begin at operation 410, where a determination may be made as to what portion of the memory 160 is subject to inspection. The portion of the memory 160 might be all of the memory 160 or a subset of the memory. The portion of the memory 160 might be executable memory pages, an address space in the memory 160 that is associated with a privileged component (e.g., a kernel or operating system), or some other portion of the memory.

From operation 410, the routine 400 may flow to operation 420, where the memory 160 may be inspected (e.g., scanned) for abnormalities. As discussed above, a whitelist 212 and/or a black list 214 might be used. Different mechanisms might also be used to detect when the memory 160 includes abnormalities. For example, anomaly based or signature-based mechanisms might be used to detect when the memory 160 includes data that should not be included in the content of the memory.

From operation 420, the routine 400 may proceed to decision operation 430, where a determination may be made as to whether the memory 160 contains abnormalities. In response to determining that the memory contains abnormalities, the routine 400 may continue to operation 450. In response to determining that the memory 160 does not contain abnormalities, the routine 400 may proceed to operation 440 where the content of the memory 160 is identified as approved. At operation 450, the content of the memory 160 may be identified as unapproved.

FIG. 5 is a flow diagram showing a routine 500 illustrating aspects of a mechanism disclosed herein for determining whether to allow access to a resource 130 based at least in part on an approved configuration of an execution environment 126. The routine 500 may begin at operation 510, where a request to access a resource 130 might be received from an execution environment 126, such as an instance 172.

From operation 510, the routine 500 may proceed to operation 520, where an access policy 216 that is associated with the resource 130 may be checked. As discussed above, the access policy 216 might include one or more rules that specify an approved configuration that is required to access the resource 130. The access policy 216 might be configured by a software provider or some other authorized user. For example, an owner or operator of the service provider network 120 might configure the access policy 216.

From operation 520, the routine 500 may proceed to operation 530, where the configuration of the execution environment 126 attempting to access the resource 130 is checked. As discussed above, the execution environment 126 may be monitored by a monitoring environment 123 that includes monitor 124 that may determine whether the execution environment 126 is in an approved configuration as specified by the access policy 216.

From operation 530, the routine 500 may proceed to decision operation 540, where a determination is made as to whether the execution environment 126 is in an approved configuration to access resource 130. In response to determining that the execution environment 126 is in the approved configuration as specified by the access policy 216, the routine 500 may flow to operation 560. In response to determining that the execution environment 126 is in an unapproved configuration as specified by the access policy 126, the routing 500 may flow to operation 550 where access to the resource 130 is prevented.

At operation 560, the execution environment 126 may be provided with access to the resource 130. As discussed above, the monitoring server 122, or some other computing device, may be configured to provide the execution environment 126 with access to the resource 130. The routine 500 may then proceed to an end operation. Alternately, the routine 500 might proceed back to repeat some or all of the processing operations described above. For example, from operation 560, the routine 500 may proceed back to operation 510.

Figure 6:
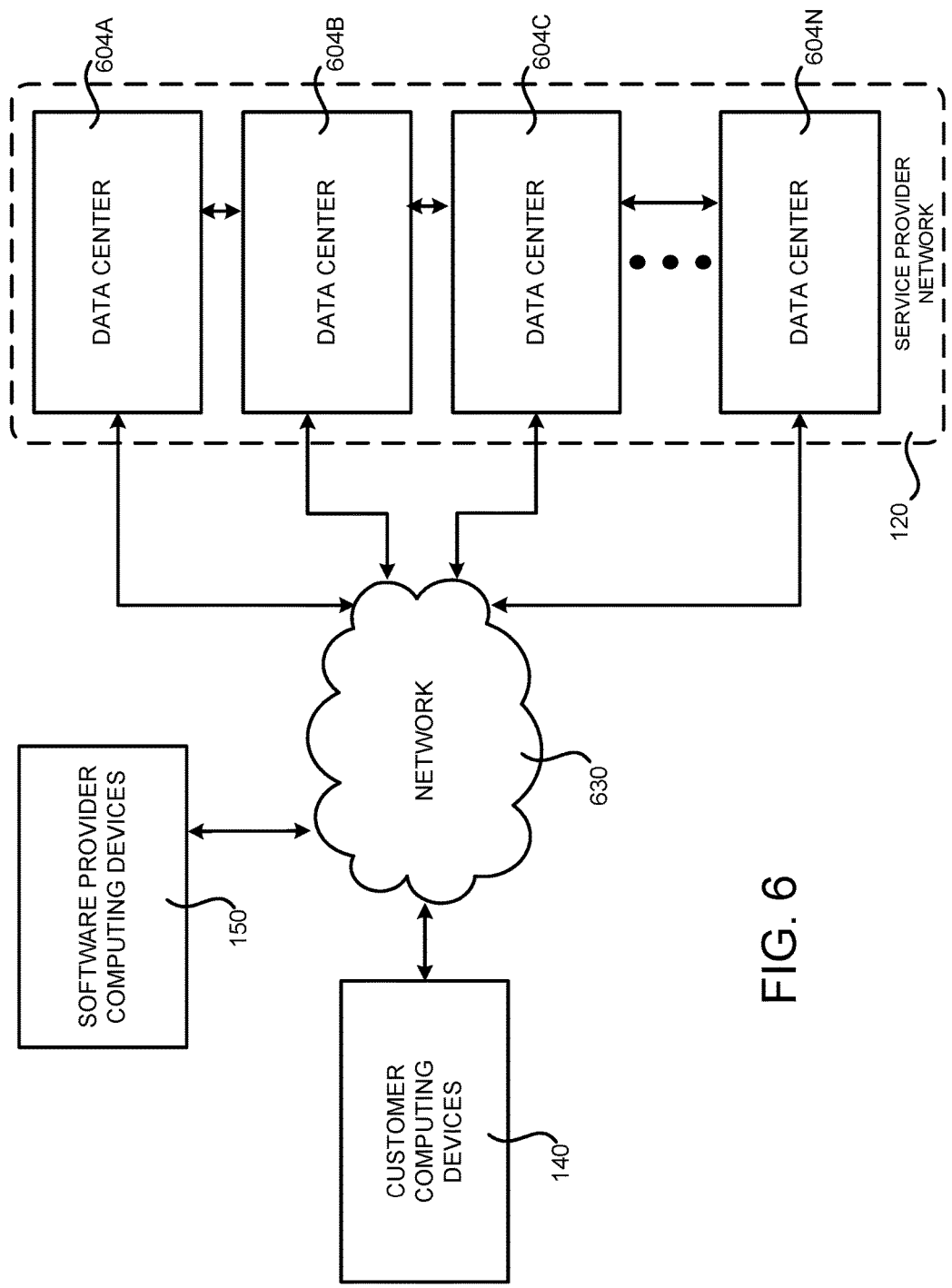
FIG. 6 is a system and network diagram that shows one illustrative operating environment for the embodiments disclosed herein that includes a service provider network.

FIG. 6 and the following description are intended to provide a brief, general description of a suitable computing environment in which the embodiments described herein may be implemented. In particular, FIG. 6 is a system and network diagram that shows an illustrative operating environment that includes a service provider network 120. As discussed above, service provider network 120 can provide virtual machine instances 172, other execution environments, and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as containers or virtual machine instances in a number of different configurations. The virtual machine instances 172 may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein for providing temporary access to resources in the service provider network 120 will be described below with regard to FIG. 7.

The users and customers of service provider network 120 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the customer computing devices 140, software provider computing devices 150 may be utilized. It should also be appreciated that combinations of such networks might also be utilized.

Figure 7:
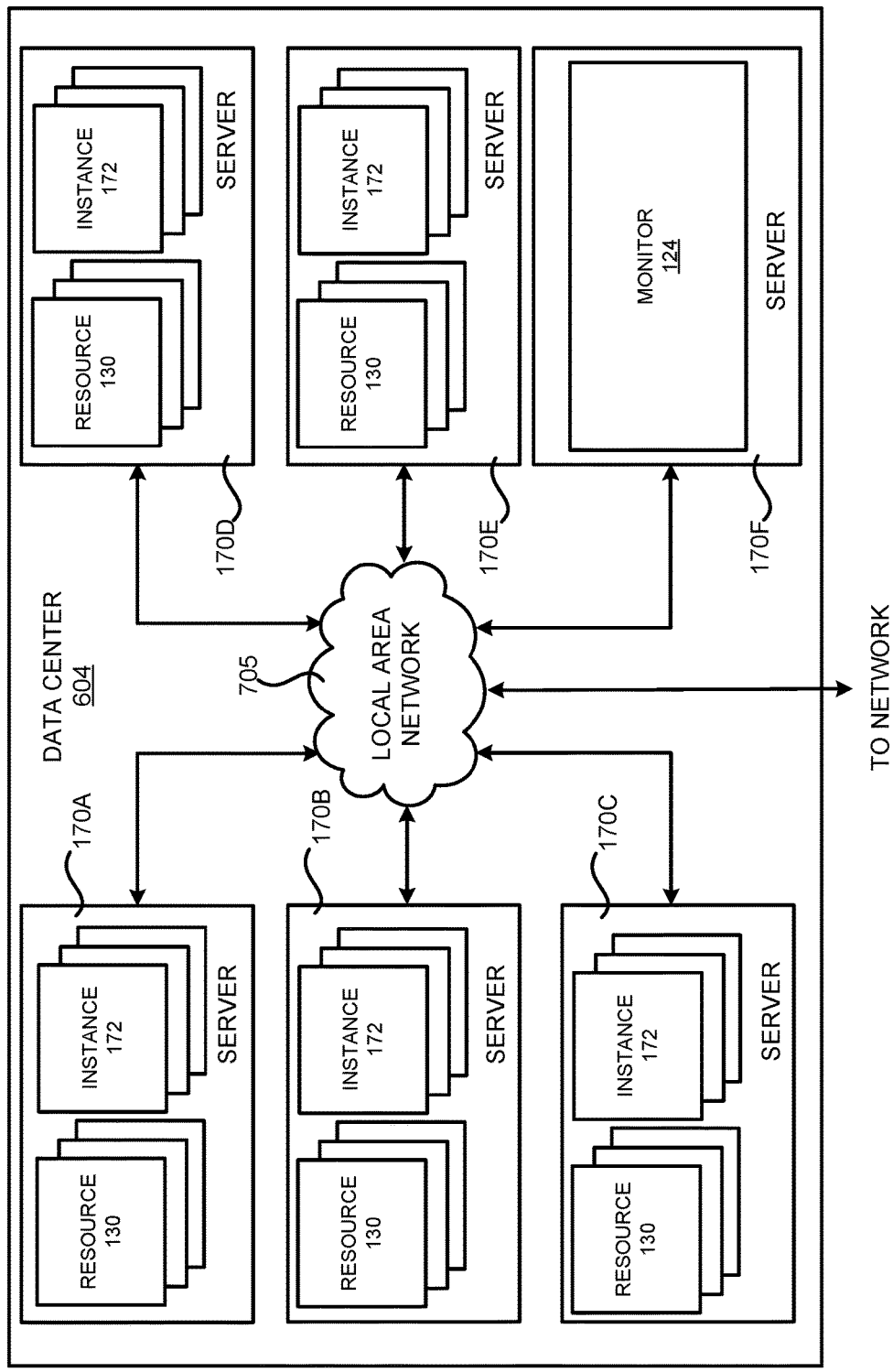
FIG. 7 is a computing system diagram that illustrates one configuration for a data center that implements aspects of a service provider network, including some or all of the concepts and technologies disclosed herein for monitoring execution environments for approved configurations.

FIG. 7 is a computing system diagram that illustrates one configuration for a data center 604 that implements aspects of a service provider network 120, including some or all of the concepts and technologies disclosed herein for monitoring instances 172 for approved configurations. The example data center 604 shown in FIG. 7 includes several computers, such as servers 170A-170F (which may be referred to herein singularly as "a server computer 170" or in the plural as "the server computers 170") for providing computing resources. The server computers 170 may be standard tower or rack-mount server computers configured appropriately for providing the computing resources described herein. According to an embodiment, the server computers 170 are configured to execute the software products as described above.

In one embodiment, some of the computing resources 704 are the virtual machine instances 172, containers, and the resources 130. As known in the art, a virtual machine instance is an instance of a software implementation of a machine (i.e. a computer) that executes programs like a physical machine. Each of the server computers 170 may be configured to execute an instance manager (not shown) capable of instantiating and managing resources 130 and VM instances 172. In the case of virtual machine instances, for example, the instance manager might be a hypervisor or another type of program configured to enable the execution of multiple virtual machine instances on a single server computer 170, for example.

It should be appreciated that although the embodiments disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 170F reserved for executing software components for managing the operation of the data center 604, the server computers 170, virtual machine instances, and other resources within the service provider network 120. The server computer 170F might also execute the monitor 124. Details regarding the operation of this component have been provided above. In this regard, it should be appreciated that while these components are illustrated as executing within the service provider network 120, computing systems that are external to the service provider network 120 might also be utilized to execute some or all of these components. Other configurations might also be utilized.

In the example data center 604 shown in FIG. 7, an appropriate local area network ("LAN") 705 is utilized to interconnect the server computers 170A-170E and the server computer 170F. The LAN 705 is also connected to the network illustrated in FIG. 7. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 170A-170F in each data center 604 and between virtual machine instances 172 and other types of computing resources provided by the service provider network 120.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
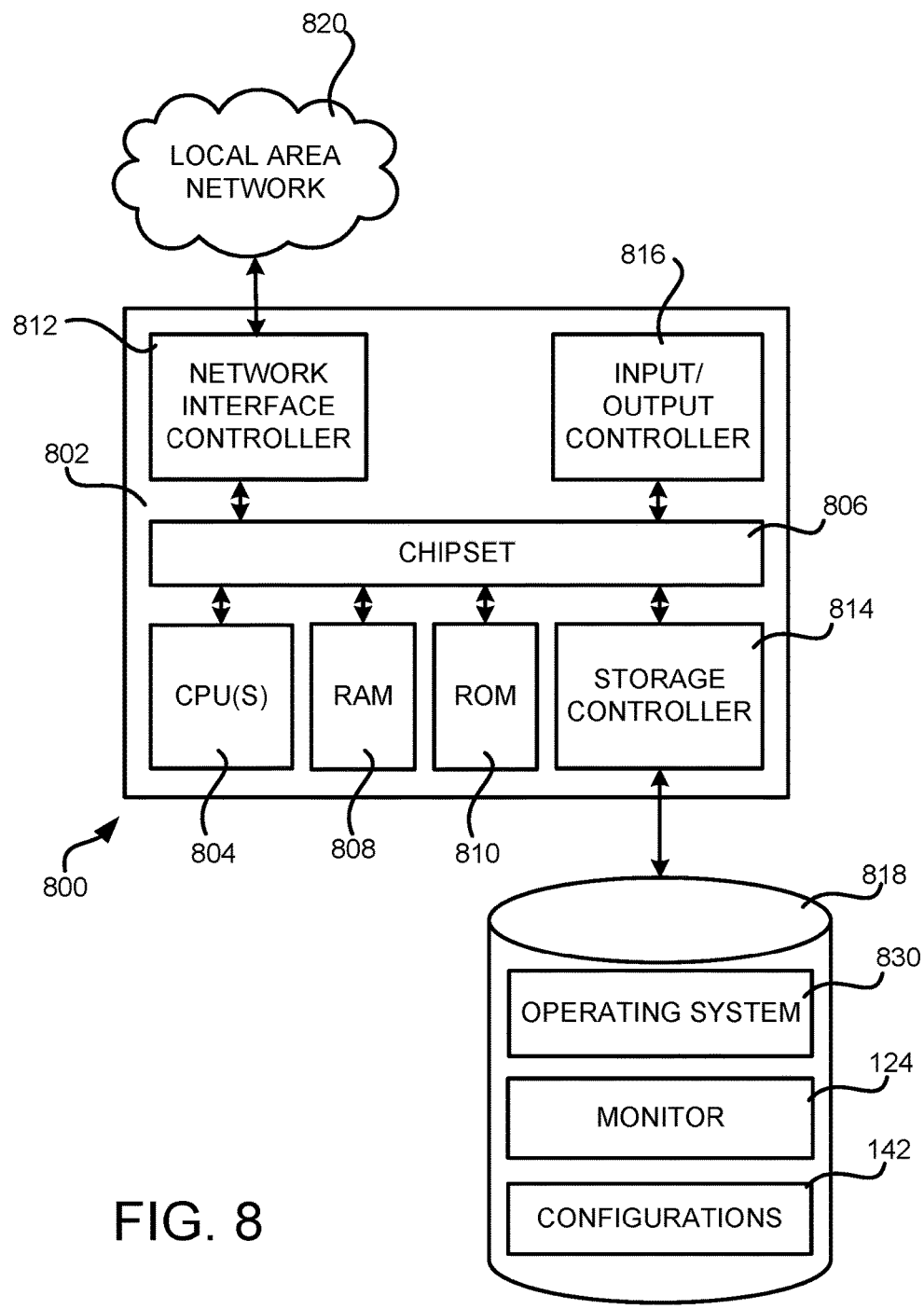
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing program components for providing access to a resource or accessing a resource in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 140, the server computers 170, the monitoring server 122, or any other of the computing systems described herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX operating system. It should be appreciated that other operating systems may also be utilized. The mass storage device 818 may store other system or application programs and data utilized by the computer 800, such as components that include the monitor 124, the configurations 142 and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 3-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Figure 9:
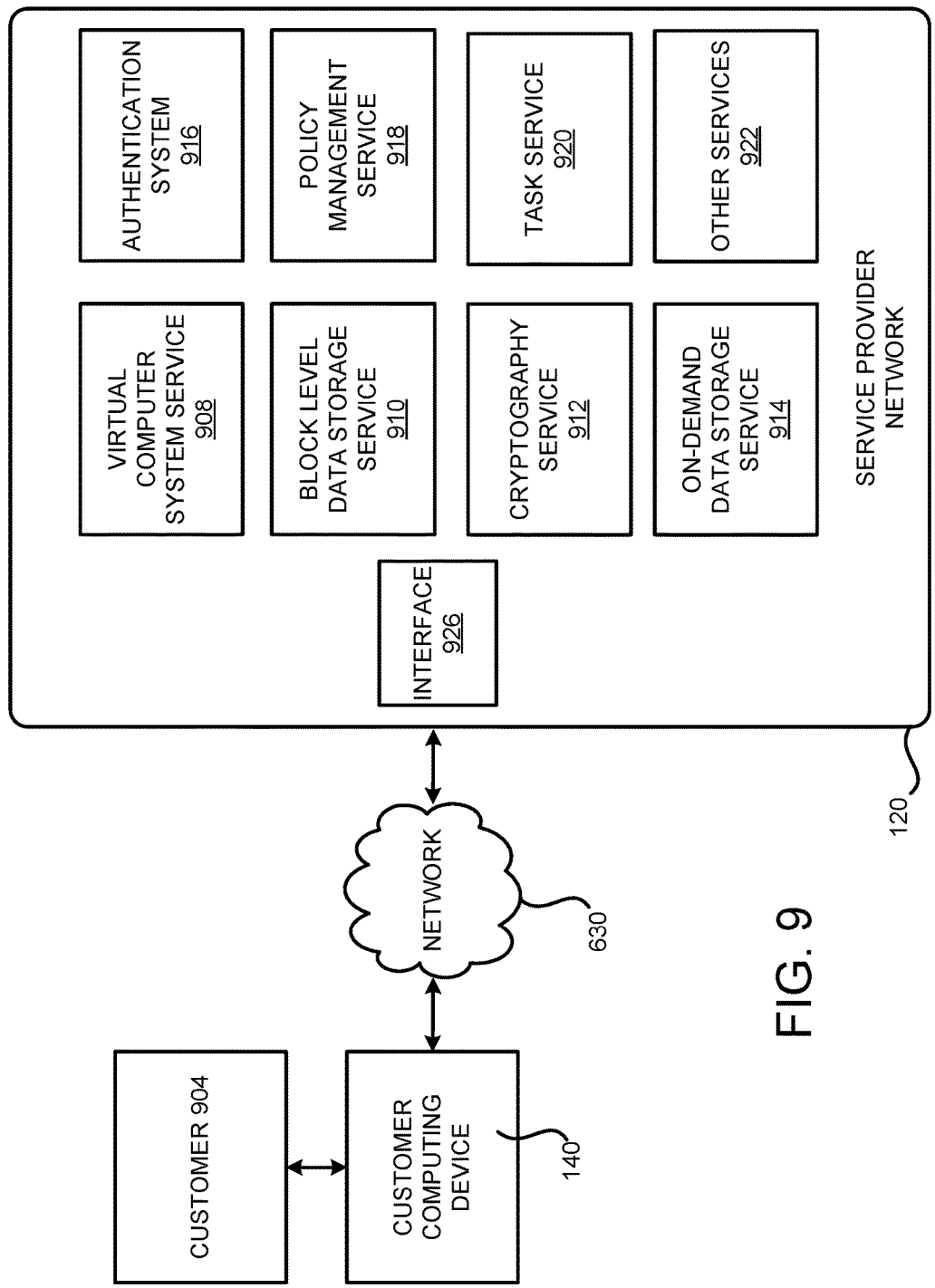
FIG. 9 is a block diagram that shows an example of computing devices connected to a service provider network in accordance with various embodiments presented herein.

FIG. 9 is a block diagram that shows an example of computing devices connected to a service provider network in accordance with an embodiment. The service provider network 120 may provide a variety of services to a customer 904 using a customer computing device 140 and the customer computing device 140 may communicate with the service provider network 120 via an interface 926, which may be a web services interface or any other type of customer interface. While FIG. 9 shows one interface 926 for the services of the service provider network 120, each service may have its own interface and, generally, subsets of the services may have corresponding interfaces in addition to or as an alternative to the interface 926. The customer 904 may be an organization that may utilize the services provided by the service provider network 120 to maintain and deliver information to its employees, which may be located in various geographical locations. Additionally, the customer 904 may be an individual that utilizes the services of the service provider network 120 to deliver content to a working group located remotely. As shown in FIG. 9, the customer computing device 140 may communicate with the service provider network 120 through a network 630, whereby the network 630 may be a communication network, such as the Internet, an intranet or an Internet service provider (ISP) network. Some communications from the customer 904 to the service provider network 120 may cause the service provider network 120 to operate in accordance with embodiments described or a variation thereof.

The service provider network 120 may provide various computing resource services to its customers. The services provided by the service provider network 120, in this example, include a virtual computer system service 908, a block-level data storage service 910, a cryptography service 912, an on-demand data storage service 914, a notification service 916, an authentication system 918, a policy management service 920, a task service 922 and other services 924. It is noted that not all embodiments described include the services 908-924 described with reference to FIG. 9 and additional services may be provided in addition to or as an alternative to services explicitly described. Each of the services 908-924 may include web service interfaces that enable the customer 904 to submit appropriately configured API calls to the various services through web service requests. In addition, each of the services may include service interfaces that enable the services to access each other (e.g., to enable a virtual computer system of the virtual computer system service 908 to store data in or retrieve data from the on-demand data storage service 914 and/or to access block-level data storage devices provided by the block level data storage service 910).

The virtual computer system service 908 may be a collection of computing resources configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the service provider network 120. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 908 is shown in FIG. 9, any other computer system or computer system service may be utilized in the service provider network 120, such as a computer system or computer system service that does not employ virtualization or instantiation and instead provisions computing resources on dedicated or shared computers/servers and/or other physical devices.

The block-level data storage service 910 may comprise computing resources that collectively operate to store data for a customer 904 using block-level storage devices (and/or virtualizations thereof). The block-level storage devices of the block-level data storage service 910 may, for instance, be operationally attached to virtual computer systems provided by the virtual computer system service 908 to serve as logical units (e.g., virtual drives) for the computer systems. A block-level storage device may enable the persistent storage of data used/generated by a corresponding virtual computer system where the virtual computer system service 908 may only provide ephemeral data storage.

The service provider network 120 also includes a cryptography service 912. The cryptography service 912 may utilize storage services of the service provider network 120 to store keys of the customers in encrypted form, whereby the keys may be usable to decrypt customer 904 keys accessible only to particular devices of the cryptography service 912.

The service provider network 120 further includes an on-demand data storage service 914. The on-demand data storage service 914 may be a collection of computing resources configured to synchronously process requests to store and/or access data. The on-demand data storage service 914 may operate using computing resources (e.g., databases) that enable the on-demand data storage service 914 to locate and retrieve data quickly, to allow data to be provided in responses to requests for the data. For example, the on-demand data storage service 914 may maintain stored data in a manner such that, when a request for a data object is retrieved, the data object can be provided (or streaming of the data object can be initiated) in a response to the request. As noted, data stored in the on-demand data storage service 914 may be organized into data objects. The data objects may have arbitrary sizes except, perhaps, for certain constraints on size. Thus, the on-demand data storage service 914 may store numerous data objects of varying sizes. The on-demand data storage service 914 may operate as a key value store that associates data objects with identifiers of the data objects that may be used by the customer 904 to retrieve or perform other operations in connection with the data objects stored by the on-demand data storage service 914.

In the environment illustrated in FIG. 9, a notification service 916 is included. The notification service 916 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 916 may provide notifications to clients using a "push" mechanism without the need to periodically check or "poll" for new information and updates. The notification service 916 may further be used for various purposes such as monitoring applications executing in the virtual computer system service 908, workflow systems, time-sensitive information updates, mobile applications, and many others.

As illustrated in FIG. 9, the service provider network 120, in various embodiments, includes an authentication system 918 and a policy management service 920. The authentication system 918, in an embodiment, is a computer system (i.e., collection of computing resources) configured to perform operations involved in authentication of users of the customer. For instance, one of the services 908-916 and 920-924 may provide information from a user to the authentication service 918 to receive information in return that indicates whether or not the user requests are authentic.

The policy management service 920, in an embodiment, is a computer system configured to manage policies on behalf of customers (such as customer 904) of the service provider network 120. The policy management service 920 may include an interface that enables customers to submit requests related to the management of policy. Such requests may, for instance, be requests to add, delete, change or otherwise modify policy for a customer or for other administrative actions, such as providing an inventory of existing policies and the like.

The service provider network 120, in various embodiments, is also equipped with a task service 922. The task service 922 is configured to receive a task package from the customer 904 and enable executing tasks as dictated by the task package. The task service 922 may be configured to use any resource of the service provider network 120, such as instantiated virtual machines or virtual hosts, for executing the task. The task service 924 may configure the instantiated virtual machines or virtual hosts to operate using a selected operating system and/or a selected execution application in accordance with a requirement of the customer 904.

The service provider network 120 additionally maintains other services 924 based at least in part on the needs of its customers 904. For instance, the service provider network 120 may maintain a database service for its customers 904. A database service may be a collection of computing resources that collectively operate to run databases for customers 904. The customer 904 may operate and manage a database from the database service by utilizing appropriately configured API calls. This, in turn, may allow a customer 904 to maintain and potentially scale the operations in the database. Other services include object-level archival data storage services, services that manage and/or monitor other services.

Based on the foregoing, it should be appreciated that technologies for monitoring instances for approved configurations have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
    perform a scan of a memory associated with a virtual machine instance in a service provider network, wherein the virtual machine instance includes a virtual processor configured to run instructions obtained from the memory, and wherein the scan of the memory is performed by a processor that is different from the virtual processor and wherein the scan is operative to detect that the virtual machine instance is in an unapproved configuration, wherein the unapproved configuration indicates one or more of an anomaly of the execution environment, or unexpected data within memory associated with the execution environment; and
    in response to determining that the virtual machine instance is in the unapproved configuration, perform one or more actions that changes an access by the virtual machine instance to one or more resources associated with the service provider network, wherein the one or more actions comprise one or more of terminating the virtual machine instance, isolating the virtual machine instance in a sandbox, or placing the virtual machine instance into a forensics mode of operation.

2. The non-transitory computer-readable storage medium of claim 1, wherein performing the scan comprises identifying a subset of the memory for inspection and determining that instructions that are contained within the subset are approved instructions.

3. The non-transitory computer-readable storage medium of claim 1, further comprising in response to detecting that the virtual machine instance is in an approved configuration, allowing the virtual machine instance to exit a sandbox that changes how the virtual machine instance accesses the one or more resources.

4. The non-transitory computer-readable storage medium of claim 1, wherein performing the scan of the memory occurs in response to a request to load a page of memory used by the virtual machine instance.

5. A system, comprising:
    one or more processors configured to:
        detect an execution environment executing on a first processor associated with a memory;
        run a monitoring environment that is coupled to the execution environment, wherein the monitoring environment is configured to monitor the execution environment to determine that the execution environment is in an unapproved configuration, wherein the unapproved configuration indicates one or more of an anomaly of the execution environment, or unexpected data within the memory, wherein the monitoring includes scanning, from outside of the execution environment, the memory to detect abnormalities associated with the memory; and
        in response to determining that the execution environment is in the unapproved configuration, changing access to one or more resources by the execution environment.

6. The system of claim 5, wherein the execution environment is a first virtual machine instance.

7. The system of claim 5, wherein the monitoring environment is a second virtual machine instance configured to read the memory.

8. The system of claim 5, wherein changing the access to the one or more resources by the execution environment comprises terminating a virtual machine instance, changing an access by the virtual machine instance to the one or more resources, or causing the virtual machine instance to be executed in a sandbox.

9. The system of claim 5, wherein the scanning comprises identifying a portion of the memory for inspection and determining that the instructions contained in the portion are approved.

10. The system of claim 5, wherein the monitoring environment is configured to intercept from the execution environment a read to an address in the memory not previously scanned and scan the memory not previously scanned before it is read by the execution environment.

11. The system of claim 5, further comprising one or more servers including one or more memories and one or more processors configured to run a configuration environment, wherein the configuration environment is configured to receive a request from a customer of a service provider network indicating software to run in the execution environment and instantiating a virtual machine instance to provide the execution environment.

12. The system of claim 5, further comprising one or more servers including one or more memories and one or more processors configured to run a configuration environment, wherein the configuration environment is configured to receive a request from a customer of a service provider network that indicates a configuration associated with the one or more resources.

13. The system of claim 5, wherein changing the access to the one or more resources comprises changing an access to a virtual network and allowing access to the configuration environment.

14. The system of claim 5, further comprising one or more servers including one or more memories and one or more processors configured to run a configuration environment, wherein the configuration environment is configured to examine an access policy to determine an approved configuration to access at least one of the one or more resources.

15. The system of claim 5, wherein at least one of the one or more computing devices of the execution environment are further operative to buffer a portion of past network traffic flowing to the execution environment and storing at least a portion of the past network traffic in response to determining that the execution environment is in the unapproved configuration.

16. The system of claim 5, wherein the scanning is performed by at least one of a hypervisor or a second virtual machine instance.

17. A computer-implemented method, comprising:
    detecting an execution environment executing on a first computing device;
    monitoring the execution environment to determine that the execution environment is in an unapproved configuration, wherein the unapproved configuration indicates one or more of an anomaly of the execution environment, or unexpected data within memory associated with the execution environment, wherein the monitoring includes scanning, from outside of the execution environment, a memory of the first computing device to detect abnormalities in the memory associated with the execution of the execution environment; and
    in response to determining that the execution environment is in the unapproved configuration, changing access to one or more resources by the execution environment.

18. The computer-implemented method of claim 17, wherein the execution environment is a first virtual machine instance.

19. The computer-implemented method of claim 17, wherein scanning the memory is performed by a second virtual machine instance that has access to the memory.

20. The computer-implemented method of claim 17, further comprising allowing the execution environment to access a configuration server in response to determining that the execution environment is in the unapproved configuration.

* * * * *